United States Patent
Kunimatsu et al.

(10) Patent No.: US 6,653,948 B1
(45) Date of Patent: Nov. 25, 2003

(54) VEHICLE-MOUNTED DISPLAY SYSTEM AND DISPLAY METHOD

(75) Inventors: Yoshimasa Kunimatsu, Aichi-ken (JP); Chikao Nagasaka, Aichi-ken (JP); Masato Nishikawa, Aichi-ken (JP); Yoshihisa Hirano, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 446 days.

(21) Appl. No.: 09/586,807

(22) Filed: Jun. 5, 2000

(30) Foreign Application Priority Data

Jun. 7, 1999 (JP) ............................................. 11-159747

(51) Int. Cl.[7] .............................................. G08G 1/123
(52) U.S. Cl. .......................... 340/995.19; 340/995.16; 340/995.23; 701/211
(58) Field of Search ................................ 340/995, 990, 340/995.19, 995.16, 995.23, 995.1; 701/208, 209, 211, 212, 213

(56) References Cited

U.S. PATENT DOCUMENTS

| | | | |
|---|---|---|---|
| 5,239,700 A | | 8/1993 | Guenther et al. |
| 5,398,188 A | * | 3/1995 | Maruyama ................. 340/995 |
| 5,757,359 A | * | 5/1998 | Morimoto et al. ........... 345/156 |
| 5,821,880 A | * | 10/1998 | Morimoto et al. ........... 340/995 |
| 5,848,373 A | | 12/1998 | DeLorme et al. |
| 6,006,161 A | * | 12/1999 | Katou ......................... 340/990 |
| 6,064,322 A | * | 5/2000 | Ohira ......................... 340/995 |
| 6,202,026 B1 | * | 3/2001 | Nimura et al. .............. 340/995 |
| 6,351,705 B1 | * | 2/2002 | Yoshioka .................... 340/461 |

FOREIGN PATENT DOCUMENTS

| | | |
|---|---|---|
| EP | 0 829 839 | 3/1998 |
| EP | 0 872 710 | 10/1998 |
| JP | 5-63163 | 8/1993 |
| JP | 8-220993 | 8/1996 |
| WO | WO 99/57517 | 11/1999 |

OTHER PUBLICATIONS

*Partial European Search Report*, Oct. 4, 2000.
*European Search Report*, Aug. 2, 2002.

* cited by examiner

*Primary Examiner*—Brent A. Swarthout
(74) *Attorney, Agent, or Firm*—Nixon Peabody, LLP (57) ABSTRACT

A display system featuring improved operability when plural screens are displayed on a display and when many functions are provided, and a method of display for the display system. A screen is selected from plural screens displayed on a display portion 20A of a display 20. The selected screen is displayed on an entire surface of the display portion 20A together with an operation menu corresponding to the selected screen.

20 Claims, 6 Drawing Sheets

VEHICLE-MOUNTED DISPLAY SYSTEM AND DISPLAY METHOD

BACKGROUND OF THE INVENTION

1. Field of the Invention

The present invention relates to a display system capable of displaying plural screens on a display and a display method for the display system, which are used for displaying pictures on a navigation device or the like device.

2. Description of the Related Art

In a display system provided in a vehicle, one of a map screen of a navigation device, an operation screen of an audio device, or an image screen (TV screen) of a TV broadcast is selected and displayed on a display.

Accompanying the widespread use of display devices having wide screens in recent years, attempts have been made to widen the screen of a display that is provided in a vehicle. As information processing capabilities have improved, further, it is becoming possible to display plural screens on a widened display.

Any of various display methods can be applied. For example, the screen may be divided into left and right divisional screen portions, with one of the portions being a highly precise map screen showing the present position of the vehicle which has been outputted from a navigation device, and the other portion being a map screen of a wider geographical region. Or, a map screen showing the current position of the vehicle can be displayed in one of the divisional screen portions, whereas a map screen showing the destination may be displayed in the other divisional screen portion. Further, it is possible to display a map screen for navigation on one of the divisional screens and display a TV screen on the other screen.

The display system has been so designed that an operation menu is displayed on the screen, an item displayed on the screen is selected by using a joy stick or by a remote controller using a touch operation pad, or the displayed item is selected when the display is touched by using a touch operation panel for the display.

However, to operate either one screen in a state where, for example, two screens are displayed on the display, it is necessary to select the screen, to change over the screen so that the selected screen is displayed on the entire display, and to display an operation menu corresponding to the screen. Further, when any one of plural map screens is to be operated in a state where plural map screens are being displayed, after the display screen has been changed over from the plural screens to the single screen which is to be generated, a main menu must be displayed for executing the navigation operation. Then, the items corresponding to the operation must be successively selected from the menu.

Thus, displaying of plural screens on the display results in an increase in the number of operations for selecting the screen that is to be operated.

On the other hand, a navigation device has been furnished with a variety of functions as technologies relating to information and information processing have advanced. Therefore, if a menu of all functions is displayed at one time, the display (e.g., the displayed words, characters, etc.) is too small despite the fact that the display screen has been widened, and the operability is poor. When the operation menu is divided into plural menus to enlarge the display of the menu, an operation is necessary for switching the operation menu.

The display system provided at the vehicle is in many cases operated by a driver. Therefore, the display system must be one that can be operated simply without complex operation.

SUMMARY OF THE INVENTION

In view of the aforementioned, an object of the present invention is to provide a display system which is easy to operate when plural screens are displayed on a display or when many functions are provided, and a display method for the display system. According to a first aspect of the invention, there is provided a vehicle-mounted display system comprising an output device which outputs data, a display for displaying, on an entire surface of a display portion of the display, a screen based on the data output from the output device, the display portion being divided into plural regions which display screens based on different data output from the output device, a screen selecting device for selecting any one of the plural screens displayed on the display, and a display control device for displaying the screen selected by the screen selecting device on the entire surface of the display portion of the display, and for displaying, on the display portion, an operation menu corresponding to the selected screen.

According to the first aspect, one screen is selected by the screen selecting device while plural screens are being displayed on the display portion. An operation menu corresponding to the screen is displayed on the display portion while the screen is displayed on the entire area of the display portion.

That is, when plural screens are being displayed, by simply selecting a screen, operation for that screen becomes possible. The troublesome operation of displaying the operation menu after the screen is changed over is thereby eliminated.

In a second aspect of the invention, in the first aspect, there is further provided a detecting device for detecting a traveling state of the vehicle, wherein when a screen is selected from the plural screens by the screen selecting device, the display device displays, on the display portion and together with the selected screen, an operation menu containing an operation item corresponding to the traveling state of the vehicle.

According to the second aspect, by selecting, by the display selecting device, display of an operation menu, the operation menu corresponding to the screen displayed on the display is displayed. Here, the detecting device detects the traveling state of the vehicle, e.g., whether the vehicle is traveling or is stopped, and an operation item set in accordance with the traveling state of the vehicle is displayed.

For example, when there are displayed items of operations that are not necessary or are prohibited during traveling, there is the possibility that such an operation item may be erroneously selected. To carry out a desired operation after an operation item is erroneously selected, it is necessary to return to the operation menu and then again select an operation item, which is troublesome.

In contrast, if only those operation items that can be operated are displayed, selection of operation items that cannot be operated is prevented.

Further, since fewer operation items are displayed on the display, it does not become difficult to read the display, as is the case when many items are displayed. Further, the operation menu need not be divided into plural segments, thereby eliminating cumbersome operations such as switching the display items in order to execute a desired operation.

According to a third aspect, the present invention provides a vehicle-mounted display system comprising an output device which outputs data, a display for displaying, on a display portion of the display, a screen based on the data outputted from the output device, a detecting device for detecting a traveling state of the vehicle, a display selecting device for selecting a suitable operation menu such that an operation menu containing at least one operation item corresponding to the screen displayed on the display is displayed, and a display control device for displaying, as an item of the operation menu, at least one predetermined operation item corresponding to the traveling state of the vehicle detected by the detecting device.

According to a fourth aspect, the output device is at least one of a navigation device, a VICS (vehicle information and communication system) device and an audio device. The navigation device outputs a travel route from the position of the vehicle to a destination. When the display device displays a map screen indicating the position of the vehicle and a map screen indicating the destination, the operation menu for the map screen indicating the position of the vehicle is different from the operation menu for the map screen indicating the destination.

According to the fourth aspect, the operation menu for the map screen indicating the present position is different from the operation menu for setting the destination.

For example, for the map screen indicating the present position, it is necessary to set the destination and to retrieve the guide route to the destination. On the other hand, in the map screen indicating the destination, the destination has been set already. Therefore, resetting of the destination, re-retrieving of a guide route and the like become necessary operation items. These operation items are set as operation items of the operation menu for the map screen indicating the destination.

Thus, by displaying only operation items suitable for the screen that is displayed, it is possible to easily and properly operate the screen that is displayed.

Thus, the present invention makes it possible to easily change over the screen displayed on the display and to easily display the operation menu for the screen that is displayed. Further, only operation items appropriate for the displayed screen are displayed, which reduces the burden of operation. Thus, for example, the need for confirming the display many times, which is bothersome, can be eliminated.

As the display method for the display system exhibits the same effects as those described above, description of the display method is omitted.

BRIEF DESCRIPTION OF THE DRAWINGS

Preferred embodiments of the present invention will be described in detail based on the following drawings, wherein.

DESCRIPTION OF THE PREFERRED EMBODIMENTS

Figure 1:
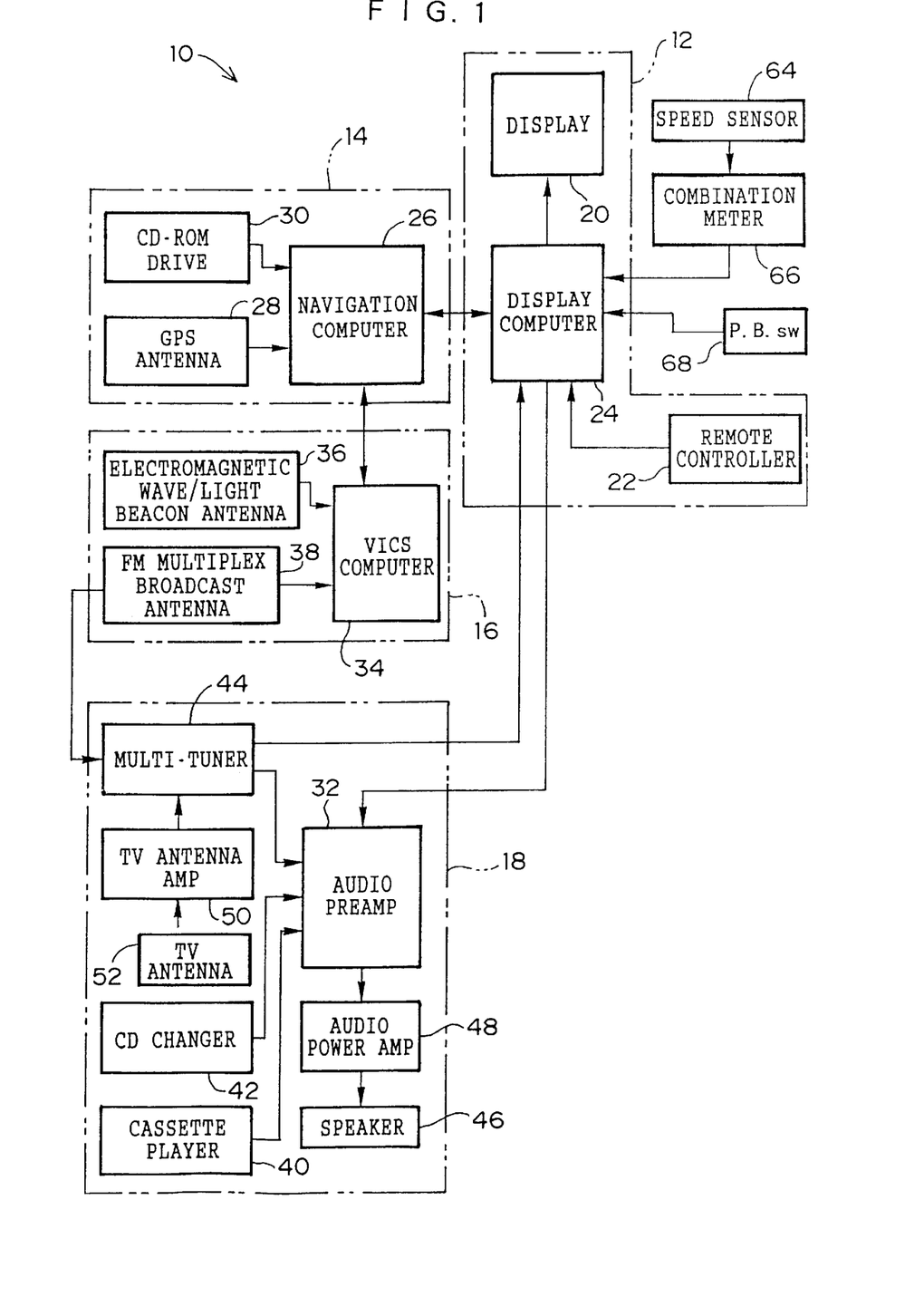
FIG. 1 is a block diagram schematically illustrating the constitution of a multi-display system to which an embodiment is applied.

An embodiment of the present invention will now be described with reference to the drawings. FIG. 1 is a diagram schematically illustrating the constitution of a multi-display system 10 to which the embodiment is applied. The multi-display system 10 is constituted by a display device 12, a navigation device 14, a VICS (vehicle information and communication system) device 16 and an audio device 18.

Figure 2:
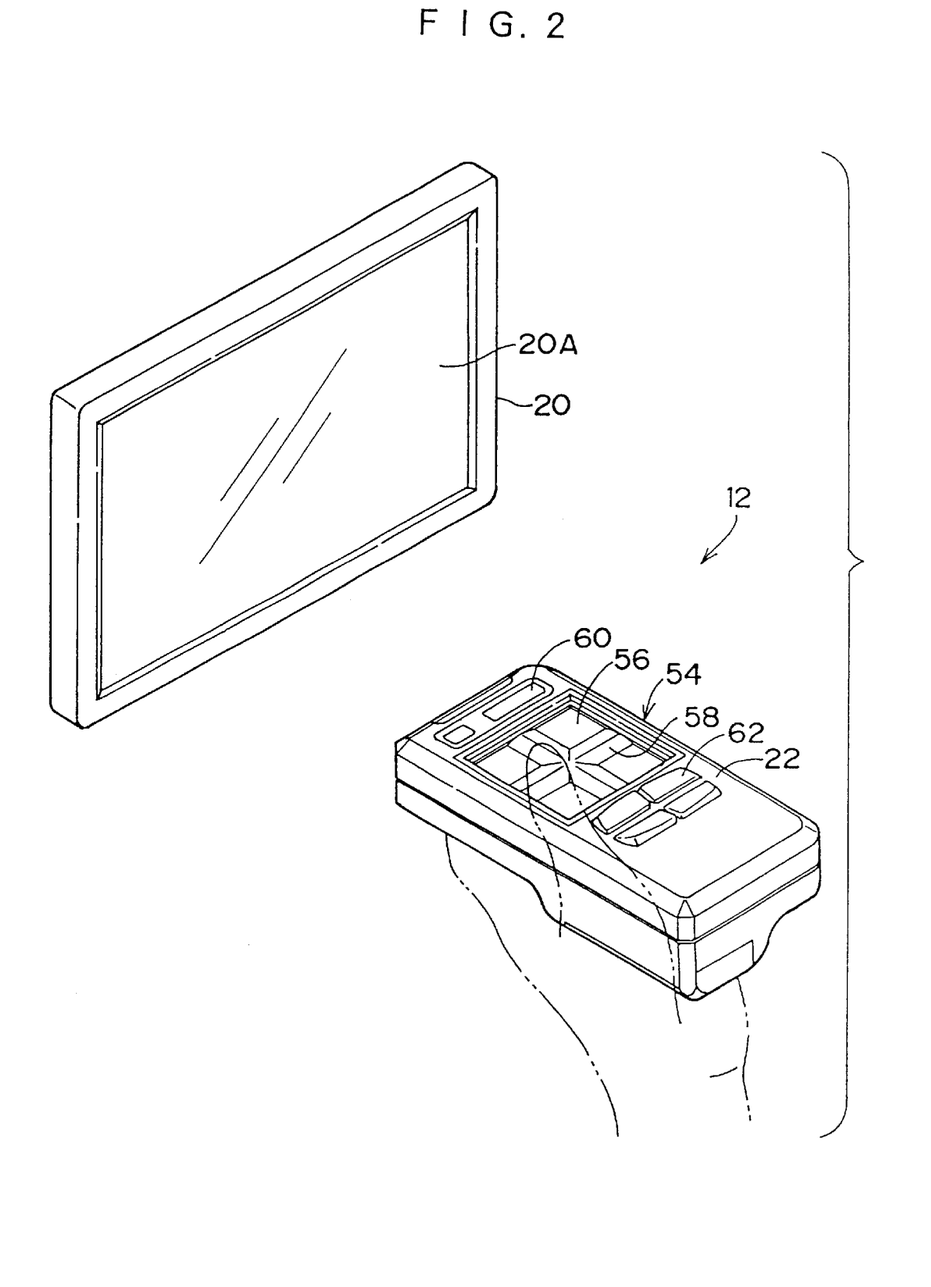
FIG. 2 is a view schematically illustrating a display and a remote controller.

As shown in FIG. 2, the display device 12 includes a display 20 of a wide screen and a remote controller 22 for operation. As shown in FIG. 1, further, the display device 12 is provided with a display computer 24 to which the display 20 is connected. Further, operation signals from the remote controller 22 received by a receiving unit that is not shown are input to the display computer 24.

The navigation device 14 includes a navigation computer 26, to which are connected a GPS antenna 28 and a CD-ROM drive 30. The navigation computer 26 is connected to a display computer 24 in the display device 12 and to an audio preamplifier 32 in the audio device 18 via the display computer 24.

On the CD-ROM drive 30 is mounted a CD-ROM recording picture data of map data, voice guide data, destination guide data and the like data. The GPS antenna 28 receives signals from a GPS satellite. The navigation computer 26 finds the present position of the vehicle relying on a signal from the GPS satellite received through the GPS antenna 28, and sends the present position of the vehicle to the display computer 24 together with the data stored in the CD-ROM mounted on the CD-ROM drive 30. Then, the display computer 24 displays the present position of the vehicle on the display portion 20A of the display 20 as a map screen.

Upon effecting a predetermined operation, the navigation computer 26 displays the map screen indicating the destination on the display portion 20A of the display 20, retrieves the guide route up to the destination, and makes a guide to the destination based on the guide (voice guide) data stored in the CD-ROM. Here, the navigation computer 26 sends voice data (voice guide data) to the audio preamplifier 32 to produce voice.

The VICS device 16 is equipped with a VICS computer 34, an electromagnetic wave/light beacon antenna 36 and an FM multiplex broadcast antenna 38, the electromagnetic wave/light beacon antenna 36 and the FM multiplex broadcast antenna 38 being connected to the VICS computer 34. The VICS computer 34 is connected to the navigation computer 26.

The VICS is a road traffic information system which offers, in real time, road traffic data related to traffic jam conditions and traffic restrictions, data related to parking areas, and data related to traveling time. The VICS device 16 receives, through the electromagnetic wave/light beacon antenna 36, the electromagnetic wave beacon installed along the expressways by the road managing agency and the light beacon installed along general highways by local police. The VICS device 16 further receives FM multiplex broadcast transmitted from various media through the FM multiplex broadcast antenna 38, and sends them to the VICS computer 34.

The VICS computer 34 processes these signals (data) and sends the data to the navigation computer 26. The navigation computer 26 displays the road traffic data on the display 20 together, as required, with the map data and the guide data. By using the road traffic data, further, the navigation computer 26 retrieves the guide route up to the destination and, as required, produces a voice guide.

A cassette player 40, a CD changer 42 and a multi-tuner 44 are connected to the audio preamplifier 32 that adjusts tone quality, right-left balance, fader and tone in the audio device 18. To the audio preamplifier 32 is further connected an audio power amplifier 48 that produces voice and the like from the speaker 46.

Further, a TV antenna 52 is connected, through a TV antenna amplifier 50, to the multi-tuner 44 to which the FM multiplex broadcast antenna 38 has been connected. The multi-tuner 44 is connected to the display computer 24.

Acoustic data input from the cassette player 40 and CD changer 42, voice data of FM and AM broadcast input from the multi-tuner 44, voice data of TV broadcast, and voice data input from the navigation computer 26, are sent to the audio power amplifier 48 in the audio device 18, so that voice corresponding to voice data is output from the speaker 46.

Further, the multi-tuner 44 sends the video data of TV broadcast to the display computer 24. Then, the display computer 24 displays a screen of TV broadcast on the display 20.

The display 20 of the display device 12, on the other hand, has a general structure including a display portion 20A, a color liquid crystal panel, and a back light using a cold cathode-ray tube (fluorescent lamp) on the back side of the color liquid crystal panel. Further, the display 20 is disposed at the center of an instrument panel (not shown) of the vehicle, and can be watched by either a driver or a passenger, and for which various operations can be effected by either the driver of the vehicle or the passenger by using either the remote controller 22 or the display on the display 20.

The display computer 24 displays a map screen based on the map data input from the navigation computer 26, and displays a TV broadcast screen based on the video data input from the multi-tuner 44. Further, the display computer 24 displays an operation screen (operation menu) indicating the operation items of the navigation device 14 on the display 20, an operation menu of the TV broadcast screen, and an operation menu of the audio device 18.

Further, the display computer 24 sends control signals based on the operation of the remote controller 22 to the navigation computer 26, multi-tuner 44, and audio preamplifier 32. Upon operating the remote controller 22 in a state where the operation menu for the navigation device 14, VICS device 16 and audio device 18 are displayed on the display 20 in the multi-display system 10, therefore, it is allowed to effect various operations for the navigation device 14, VICS device 16 and audio device 18.

Referring to FIG. 2, the remote controller 22 is provided with a touch operation panel (hereinafter referred to as "touch tracer 54"). A finger guide protuberance 58 is formed in a crossing shape on an input pad 56 of the touch tracer 54. Without the need of taking a look at the input pad 56, the finger guide protuberance 58 makes it possible to recognize the operation positions upon touching the input pad 56 by finger. Further, the finger guide protuberance 58 prevents the fingers from being deviated when the finger is slid in the lateral direction or in the longitudinal direction during the operation, and the touch tracer 54 can be operated by blind touching. The finger guide protuberance 58 may have a triangular shape in cross section as shown or may have an arcuate shape.

The touch tracer 54 detects in which one of the nine regions of the input pad 56 divided into three segments in both the longitudinal and transverse directions, the finger exists. When the touch tracer 54 detects a finger on the input pad 56, the display computer 24 renders a region on the display 20 to be corresponded depending upon the detected position of the finger, e.g., indicates the item of the corresponding region by in a reversed manner when, for example, the operation menu is displayed. When the input pad 56 is depressed by touch operation by the finger in this state, the operation item corresponding to the region is selected on the display portion 20A of the display 20.

When the detected position of finger moves as a result of tracing the input pad 56 by finger in a state where the map is displayed, for example the display computer 24 executes a processing such as scrolling the map screen to meet the motion of the finger.

In this embodiment, the finger guide protuberance 58 is formed on the input pad 56. It is, however, also allowable to form a groove for guiding the finger instead of the protuberance. In this embodiment, further, the finger guide 58 is formed in a crossing shape on the surface of the input pad 56. The finger guide, however, may be formed in any shape provided the operator is allowed to recognize the position of his finger on the input pad 56 upon blind touching. In this embodiment, further, various items are selected by using the touch tracer 54. Not being limited to the touch tracer 54, however, the remote controller 22 may be provided with a joy stick. Or, instead of using the remote controller 2, a touch panel may be used for the display 20 to select a predetermined region by tracing or depressing the area on the screen 20A of the display 20 by finger.

The remote controller 22 is equipped with a menu switch 62 together with a power source switch 60. Upon manipulating the menu switch 62, a main menu is displayed for selecting the display screen on the display 20. The multi-display system 10 changes the screen displayed on the display 20 from this main menu over to any one of navigation, TV broadcast or audio.

Upon touching any region on the input pad 56 of the touch tracer 54 in a state where the map screen for navigation is displayed on the display 20, further, the multi-display system 10 displays the operation menu for navigation on the display portion 20A of the display 20. Upon touching any region on the input pad 56 in a state where the TV broadcast screen is displayed on the display portion 20A of the display 20, the operation menu for TV broadcast is displayed. The display of main menu, operation menu for audio, operation menu for navigation and operation of TV screen may comply with the conventional method of operation, and is not described in detail in this embodiment.

The display device 12 uses the display 20 in which the display portion 20A offers a wide screen. Therefore, the display portion 20A of the display 20 is divided into plural regions, and different images and pictures are displayed in the divided regions, creating a multiple display.

Figure 3A:
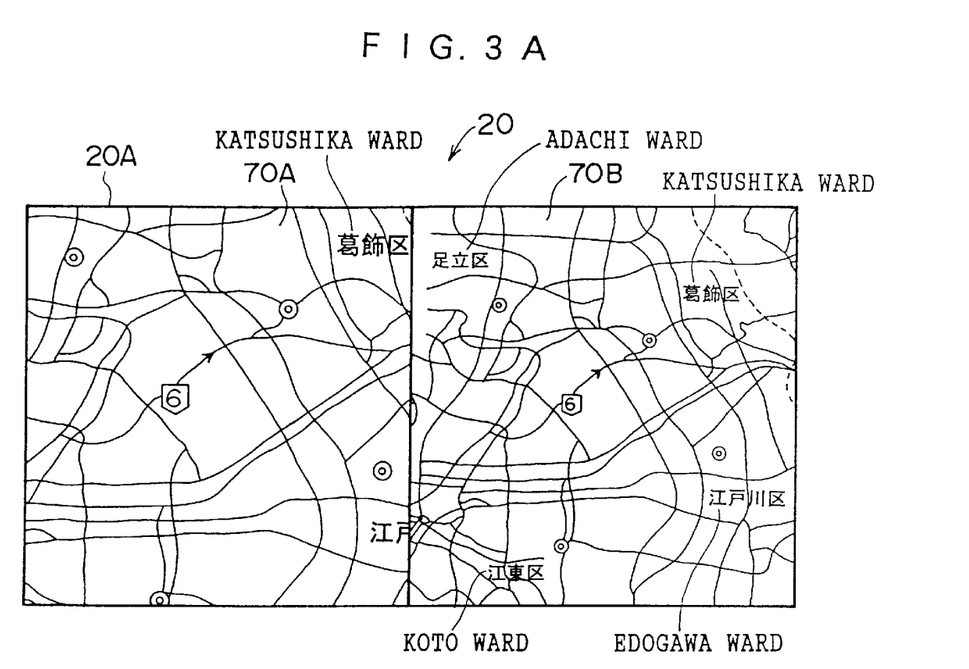
FIG. 3A is a diagram schematically illustrating a display on the display, and shows a map screen of a narrow area as well as a map screen of a wide area, wherein wards (districts) in Tokyo, Japan are displayed as an example.

Referring, for example, to FIG. 3A, the display portion 20A of the display 20 in the multi-display system 10 is divided into right and left regions, the one region displaying a detailed (i.e., narrow area) map screen 70A indicating the present position of the vehicle and the other region displaying a map screen 70B of a wide area indicating the present position of the vehicle. In the multi-display system 10, further, the map screen indicating the present position of the vehicle may be displayed on one of the right and left regions and the map screen indicating the destination may be displayed on the other region (not shown).

In the multi-display system 10, further, data input from different sources may be simultaneously displayed on the display 20. As shown in, for example, FIG. 4A, a video screen of TV broadcast (hereinafter referred to as "TV screen") 72A may be displayed on one of the right and left regions on the display portion 20A, and a map screen 72B indicating the present position for navigation may be displayed on the other region.

In the multi-display system 10, on the other hand, the screen of the corresponding region can be displayed on the whole area of the display portion 20A of the display 20 upon touching the region on the input pad 56 of the touch tracer 54 corresponding to any region in a state where plural screens are displayed on the display 20. Together with this, an operation menu corresponding to the displayed screens is displayed on the display 20.

Figure 3B:
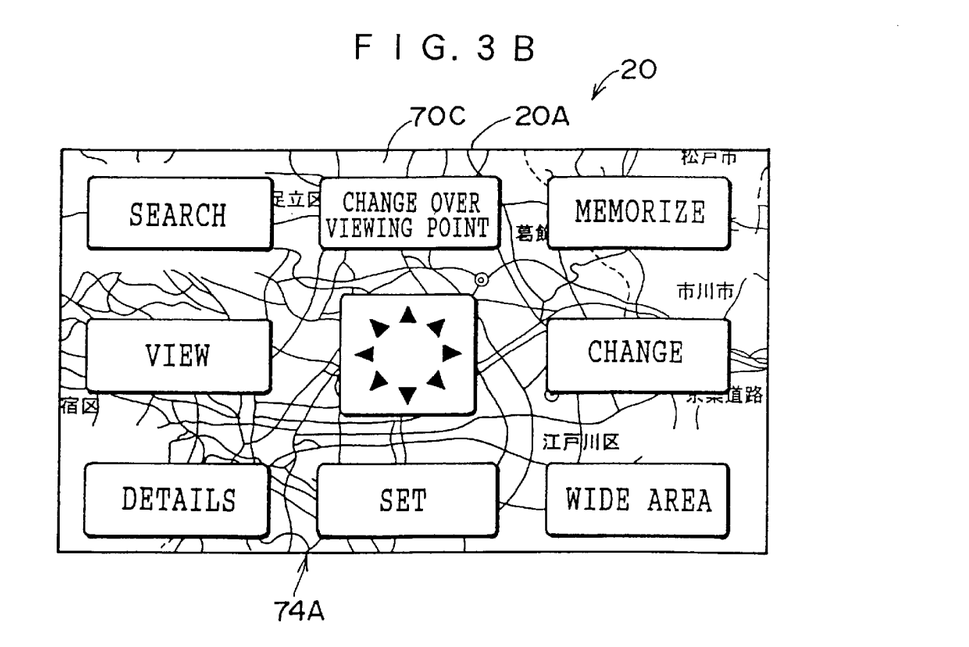
FIG. 3B is a diagram schematically illustrating a display on the display, and shows a map screen and an operation menu of when the map screen of a wide area is selected in FIG. 3A.

Referring, for example, to FIG. 3A, when the map screen 70B is selected in a state where map screens 70A and 70B are displayed, then, the operation menu 74A for navigation is displayed as shown in FIG. 3B together with a map screen 70C corresponding to the map screen 70B.

As shown in FIG. 1, further, a vehicle-speed signal output from a vehicle speed sensor 64 installed on the vehicle is input to the display computer 24 through a combination meter 66. To the display computer 24 is further connected a parking brake switch 68 or the like that is turned on and off by the application of the parking brake.

On the basis of the vehicle speed detected by the vehicle-speed sensor 64 and whether the parking brake switch 68 is on or off, the display computer 24 judges the traveling state of the vehicle, i.e., whether the vehicle is traveling or is stopped.

In the display computer 24 have been set items that can be operated even when the vehicle is traveling and items that can be operated only when the vehicle is at rest in their respective operation menus. When the operation menu is displayed, the display computer 24 clearly shows whether the item is the one that can be operated or the item is the one that is inhibited for its operation.

Figure 4A:
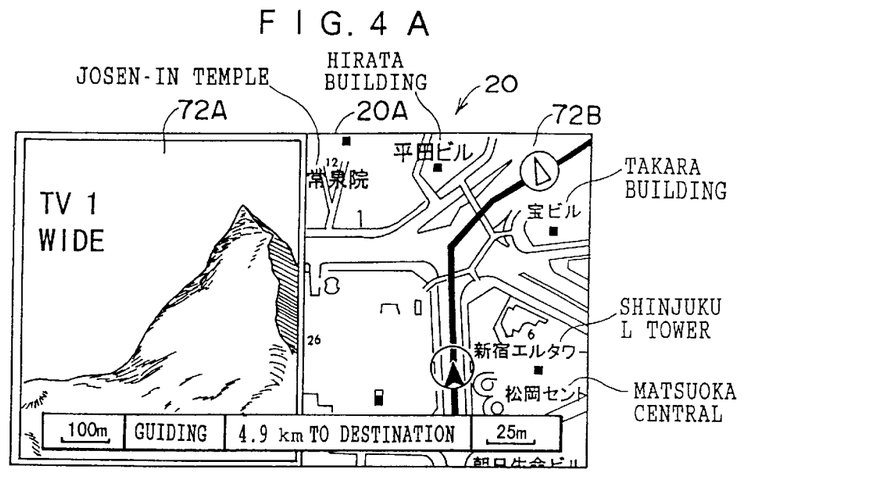
FIG. 4A is a view schematically illustrating a display on the display, i.e., displaying a TV screen and a map screen.

When the vehicle is stopped, the map screen 72B may be selected in a state where the TV screen 72A and the map screen 72B are displayed as shown in FIG. 4A. Then, as shown in FIG. 4C, a map screen 72D corresponding to the map screen 72B is displayed, and an operation menu 74A corresponding to the map screen 72D is displayed.

Figure 4B:
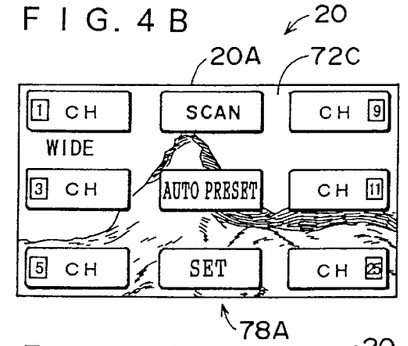
FIG. 4B is a view schematically illustrating a display on the display, i.e., displaying a TV screen that is selected when the vehicle is at rest and an operation menu.
Figure 4C:
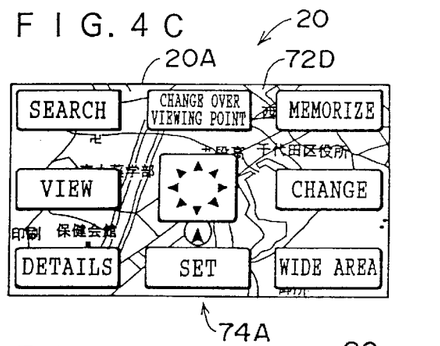
FIG. 4C is a view schematically illustrating a display on the display, i.e., displaying a map screen that is selected when the vehicle is at rest and an operation menu.
Figure 4D:
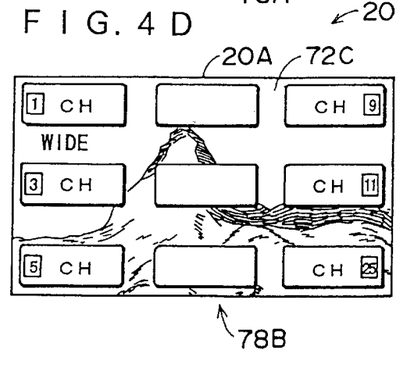
FIG. 4D is a view schematically illustrating a display on the display, i.e., displaying a TV screen that is selected when the vehicle is traveling and an operation menu.
Figure 4E:
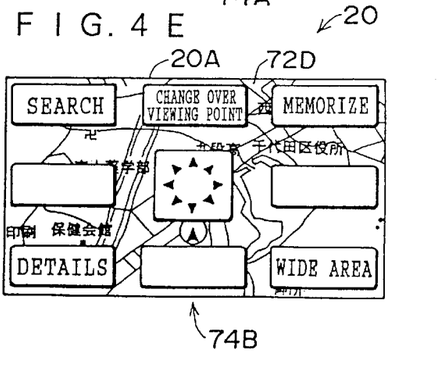
FIG. 4E is a view schematically illustrating a display on the display, i.e., displaying a map screen that is selected when the vehicle is traveling and an operation menu.

When the vehicle is traveling, on the other hand, the characters of operation items that cannot be operated are not displayed as shown in FIG. 4E, and the operation menu 74B of only those items that can be operated is displayed together with the map screen 72D. Here, the operation items of which the characters are not displayed cannot be selected.

Figure 5:
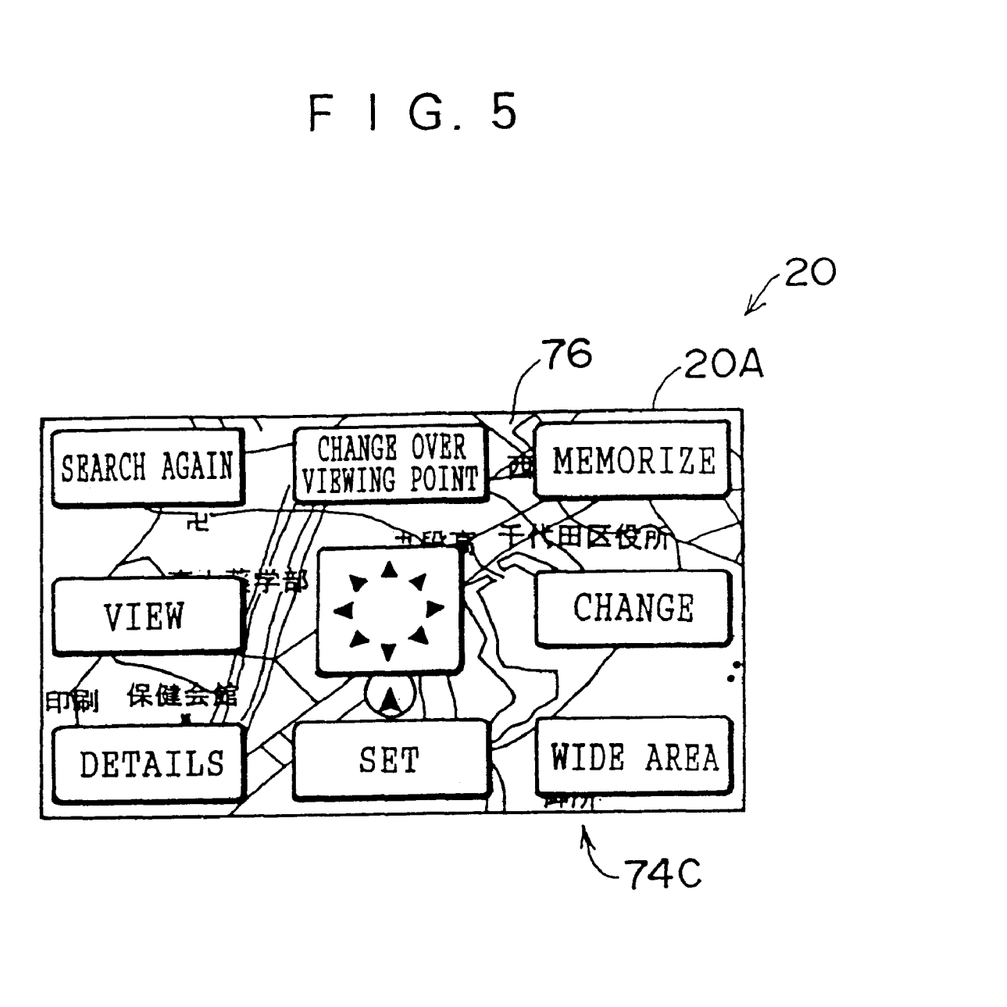
FIG. 5 is a view schematically illustrating a map screen indicating a destination and an operation menu for the map screen.

When the map screen (not shown) indicating the destination is selected, an operation menu 74C corresponding to the map screen 76 of the destination is displayed as shown in FIG. 5. In the operation menu 74C for which the destination has been set already, the operation item "SEARCH AGAIN" is displayed in contrast with the operation item "SEARCH" displayed by the operation menus 74A and 74B.

When a TV screen 72A is selected from a display state shown in FIG. 4A while the vehicle is at rest, an operation menu 78A is displayed as shown in FIG. 4B including operation items of "STATION SELECTION BUTTONS", "SCAN BUTTON", "PRESET BUTTON" and "SET BUTTON" together with a TV screen 72C corresponding to the TV screen 72A.

When the vehicle is traveling, on the other hand, an operation menu 78B is displayed showing the "STATION SELECTION BUTTONS" only as items to be operated, and showing the frames of "SCAN", "PRESET, "SET" as blank frames without character.

In the multi-display system 10, therefore, when the display is changed over by selecting only one of the screens displayed in a divided manner on the display portion 20A of the display 20, the operation that has been set for the corresponding screen can be continued.

Operation of the embodiment will now be described.

The navigation device 14 provided in the multi-display system 10 receives signals from the GPS satellite through the GPS antenna 28, and operates the present position of the vehicle based on the received signals. Further, the map data are read out from the CD-ROM mounted on the CD-ROM drive 30 and are output to the display computer 24 together with the present position. When the display of a map screen is selected, the display computer 24 displays the map screen indicating the present position on the display portion 20A of the display 20.

Further, upon selecting the display of a TV image, the multi-display system 10 displays the TV screen on the display portion 20A of the display 20, and the speaker 46 in the audio device 18 produces TV voice corresponding to the TV screen.

In the multi-display system 10, on the other hand, the display 20 is employing a display portion 20A of a wide screen. Therefore, the display portion 20A is divided into plural regions to display different pictures on the divided regions.

Here, the multi-display system 10 displays a predetermined picture on the display portion 20A of the display 20 and, further, displays an operation menu corresponding to the displayed picture upon operating the remote controller 22, so that various operations can be conducted from the operation menu.

Figure 6:
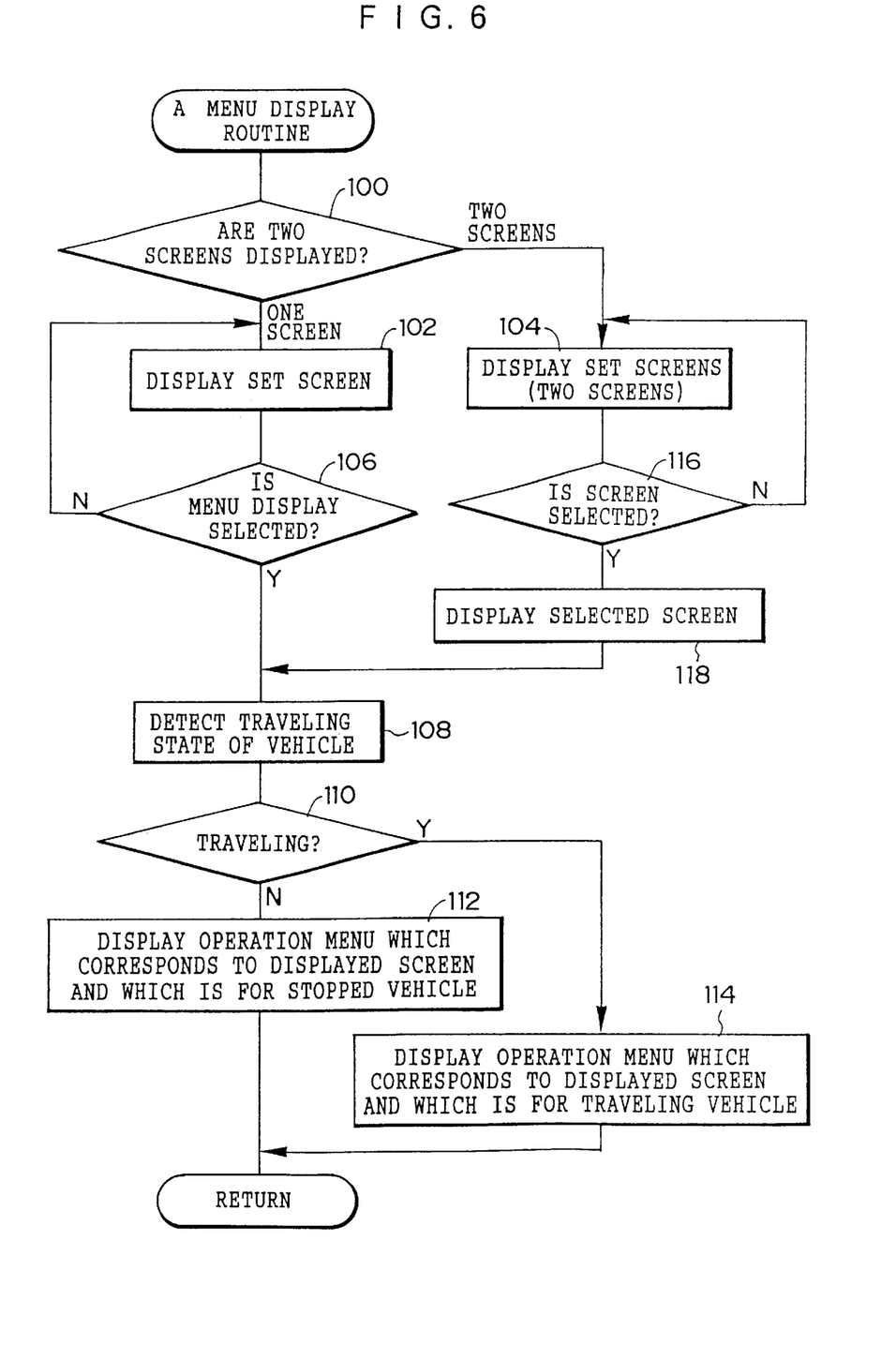
FIG. 6 is a flowchart schematically illustrating the procedure for displaying an operation menu on the display portion.

Schematically described below are to change over the picture displayed on the multi-display system 10 and the display of the operation menu while making reference to a flowchart shown in FIG. 6. The flowchart is executed upon displaying, on the display portion 20A of the display 20, a map screen based on map data output from the navigation device 14 and a TV screen based on the TV image output from the audio device 18. The following description deals with a case where the map screen for navigation and a TV screen for TV broadcast are displayed.

At step 100, first, it is judged whether two screens are displayed or one screen is displayed. When one screen is displayed, the routine proceeds to step 102 to display a preset screen on the display portion 20A of the display 20. That is, either a map screen for navigation or a TV screen for TV broadcast is displayed.

When two screens are displayed, the routine proceeds to step 104 to display preset screens. Therefore, there may be displayed the detailed map screen 70A indicating the position of the vehicle and the map screen 70B of a wide area as shown in FIG. 3A, or there may be displayed the TV screen 72A and the map screen 72B for navigation as shown in FIG. 4A. Or, the pictures may be displayed in various combinations such as displaying the map screen indicating the position of the vehicle and the map screen indicating the destination.

In a state where the display of one picture is selected at step 100 and the preset picture is displayed on the display 20 at step 102, it is, then, judged at step 106 whether the display of operation menu is selected.

For example, when a predetermined operation is executed for selecting the display of operation menu such as operating the menu switch 60 provided in the remote controller 22 or touching the input pad 56 of the touch tracer 54, it is judged at step 106 that the display of menu is selected, and the routine proceeds to step 108 where the traveling state of the vehicle is detected based on the traveling speed of the vehicle detected by the vehicle-speed sensor 64 and the state of the parking brake switch 68.

Then, at step 110, it is judged whether the vehicle is traveling or not. When the vehicle is stopped, it is judged at step 110 that the vehicle is stopped, and the routine proceeds to step 112 where the operation menu to be operated while the vehicle is stopped is displayed on the display portion 20A of the display 20.

When, for example, the TV screen 72C is displayed on the display portion 20A of the display 20, the operation menu 78A corresponding to the TV screen 72C is displayed as shown in FIG. 4B. When the map screen 70C or the map screen 72D is displayed on the display portion 20A of the display 20, further, the operation menu 74A for the map screen 70C or 72D is displayed as shown in FIGS. 3B and 4C. Further, when the map screen 76 indicating the destination is displayed on the display portion 20A of the display 20, the operation menu 74C for the map screen 76 indicating the destination is displayed as shown in FIG. 5.

When the vehicle is traveling, on the other hand, it is judged at step 110 that the vehicle is traveling, whereby the routine proceeds to step 114, and the operation menu corresponding to the traveling vehicle is displayed on the display portion 20A of the display 20.

When the TV screen 72C is displayed on the display portion 20A of the display 20, the operation menu 78B is displayed on the TV screen 72C as shown in FIG. 4D showing characters of only those items that can be operated while the vehicle is traveling. When the map screen 72D is displayed on the display portion 20A of the display 20, further, the operation menu 74B is displayed on the map screen 72D as shown in FIG. 4E showing characters of only those items that can be operated while the vehicle is traveling.

Thus, the operation menu is selectively displayed based upon whether the vehicle is traveling or not. This eliminates such an occurrence that the operation item that can be operated only when the vehicle is at rest is erroneously selected when the vehicle is traveling, and that the operator must display again the operation menu that is necessary for the operation through cumbersome operation.

Further, the item to be displayed is changed depending upon the displayed screen like displaying the operation menu 74A when the map screens 70C, 72D are displayed indicating the position of the vehicle, and displaying the operation menu 74C when the map screen 76 indicating the destination is displayed, facilitating the operation for the screen displayed on the display portion 20A of the display 20.

That is, the operation menus 74A, 74B shown in FIGS. 3B, 4C and 4E include an operation item "SEARCH" for searching the route to the destination, whereas the operation menu 74C for the map screen 76 indicating the destination shown in FIG. 5 includes the operation item "SEARCH AGAIN". When the map screen indicating the destination is displayed, it can be considered that the destination has been set already and the route to the destination has been set already. Therefore, the operation menu 74C for the map screen 76 indicating the destination contains the operation item "SEARCH AGAIN".

Upon displaying the operation menu containing only those operations suited for the displayed screen, as described above, it is allowed to prevent the occurrence of error in the operation and to properly execute the desired operation.

When two screens are displayed on the display 20 at step 104, on the other hand, it is judged at step 116 whether either one of the two screens is selected by the operation of the touch tracer 54.

Here, when either one screen is to be operated, a region on the input pad 56 corresponding to the screen is touched. It is then judged at step 116 that the screen is selected, and the routine proceeds to step 118. At step 118, the screen selected out of the two screens at step 116 is displayed on the display portion 20A of the display 20. Thereafter, the routine proceeds to step 108 to display an operation menu corresponding to the traveling state of the vehicle.

Upon touching the region on the input pad 56 corresponding to the map screen 70B in a state where the map screens 70A and 70B are displayed as shown in, for example, FIG. 3A, then, the map screen 70C corresponding to the map screen 70B is displayed on the whole screen of the display portion 20A of the display 20 as shown in FIG. 3B. When the vehicle is stopped (NO at step 110), the routine proceeds to step 112 where the operation menu 74A is also displayed. When the map screen indicating the destination is selected, the map screen 76 corresponding to the map screen indicting the destination is displayed on the display portion 20A of the display 20, and there is displayed the operation menu 74C corresponding to the map screen 76 indicating the destination when the vehicle is at rest.

Referring to FIG. 4A, further, when a region on the input pad 56 corresponding to the map screen 72B is touched in a state where the TV screen 72A and the map screen 72B are displayed, the map screen 72D corresponding to the map screen 72B is displayed on the whole screen. Here, when the vehicle is at rest (NO at step 110), the operation menu 74A is displayed (step 112) as shown in FIG. 4C. When the vehicle is traveling (YES at step 110), the operation menu 74B is displayed displaying the characters of only those operation items that can be operated while the vehicle is traveling (step 114).

When a region on the input pad 56 corresponding to the TV screen 72A is touched, the TV screen 72C corresponding to the TV screen 72A is displayed on the whole screen. Here, when the vehicle is at rest (No at step 110), the operation menu 78A is displayed (step 112) as shown in FIG. 4B. When the vehicle is traveling (YES at step 110), the operation menu 78B is displayed displaying the characters of only those operation items that can be operated while the vehicle is traveling (step 114).

According to the multi-display system 10 as described above, a corresponding screen can be easily selected by simply touching a region on the input pad 56 corresponding to either one of the two screens that are displayed on the display portion of the display 20. Besides, the operation menu corresponding to the screen is displayed to easily and smoothly execute the processing for the displayed screen from the state where the two screens are displayed.

Further, when the operation menu corresponding to the screen is displayed, there are displayed the characters of only those operation items that can be operated depending upon the traveling state of the vehicle, reliably preventing the occurrence of erroneous operation.

In the multi-display system 10, only those operation items corresponding to the screen displayed on the display portion 20A of the display 20 are displayed as an operation menu, eliminating the switches that correspond to the remote controller 22 for executing the operation.

The operation for the screen that is displayed can also be executed by providing the remote controller 22 with plural switches and by selecting the operation by using the switches. However, since there is a limitation on the number of the switches, plural switching operations become necessary for selecting a processing. In particular, the number of operation items increases with an increase in the number of the functions to meet an increase in the amount of data and in the processing ability, causing the switching operation to become complex.

On the other hand, when the operation items set depending on the displayed screen only are displayed on the screen and the displayed operation items are selected by using the remote controller, then, the complex switching operation can be omitted and unnecessary operation items are not displayed. This prevents the display from becoming difficult to watch, prevents the occurrence of erroneous operation, and makes it possible to easily and properly execute the desired operation.

The above-described embodiment is not interested to limit the structure of the present invention. In this embodiment, the display portion 20A of the display 20 was divided into the right and left regions to display two screens. The display portion 20A, however, may be divided into an upper region and a lower region, or may be divided in an inclined manner into, for example an upper right region and a left lower region. Or, either one region may have a large area and the other region may have a small area.

In this embodiment, further, the display portion 20A of the display 20 was divided into two. The display portion 20A, however, may be divided into three, four, etc. to display predetermined pictures thereon.

In this embodiment, further, the items that can be operated and the items that are set not to be operated (characters of the items were displayed or not displayed) were displayed depending upon the traveling state of the vehicle (whether traveling or at rest), to which only, however, the display is in no way limited. For example, only the items that can be operated may be displayed. That is, only those items that can be operated may be picked up and displayed.

When there are so many operation items that they cannot be displayed on one screen, the menu being displayed must be switched to select desired operation items. Here, a selective display of only those items that can be operated helps decrease the number of items to be displayed and eliminates the need for switched the menu for selecting the operation items.

This embodiment is provided with the display computer 24 separately from the navigation computer 26. However, the function of the display computer 24 may be executed by the navigation computer 26. That is, this embodiment has dealt with the multi-display system 10 having the navigation device 14 and the audio device 18 as the output devices. However, the multi-display system 10 may be applied as a navigation system having the audio device 18 as the output device.

According to the present invention as described above, any screen is selected out of plural screens displayed on the display, and is displayed on the whole screen of the display and, at the same time, the operation menu corresponding to the screen is displayed. The operation menu displays only those predetermined operation items corresponding to the traveling state of the vehicle. This makes it possible to reliably execute a predetermined operation through simple operation, which is an excellent effect.

What is claimed is:

1. A vehicle-mounted display system comprising:

an output device which outputs data;

a display for displaying, on an entire surface of a display portion of the display, a screen based on the data output from the output device, the display portion being divided into plural regions which display screens based on different data output from the output device;

a screen selecting device for selecting any one of the plural screens displayed on the display; and a display control device means for displaying the screen selected by the screen selecting device on the entire surface of the display portion of the display, and for simultaneously displaying, on the display portion and together with the selected screen, an operation menu corresponding to the selected screen at the time said selected screen is selected, wherein said operation menu is substantially uniformly displayed over said entire surface of said display portion, and said operation menu covers a substantial portion of an area of said entire surface of said display portion until an item on the operation menu is selected.

2. A vehicle-mounted display system according to claim 1, further comprising a detecting device for detecting a traveling state of the vehicle, wherein when a screen is selected from the plural screens by the screen selecting device, the display device means displays, on the display portion, an operation menu containing an operation item corresponding to the traveling state of the vehicle.

3. A vehicle-mounted display system according to claim 2, wherein the detecting device detects, as the traveling state of the vehicle, a state where the vehicle is traveling and a state where the vehicle is stopped.

4. A vehicle-mounted display system according to claim 1, wherein the output device is at least one of a navigation device, a VICS (vehicle information and communication system) device and an audio device.

5. A vehicle-mounted display system according to claim 1, wherein the screen selecting device is a remote controller having a touch pad with a protuberance forming boundaries of division, the touch pad being divided in accordance with division of the screen and enabling the boundaries of division to be perceived upon touching by hand.

6. A vehicle-mounted display system comprising:
an output device which outputs data;
a display for displaying, on a display portion of the display, a screen based on the data outputted from the output device;
a detecting device for detecting a traveling state of the vehicle;
a display selecting device for selecting a suitable operation menu such that an operation menu containing at least one operation item corresponding to the screen displayed on the display is displayed; and
a display control device means for displaying the screen selected by the screen selecting device on the entire surface of the display portion of the display, and for simultaneously displaying, on the display portion and together with the selected screen, as an item of the operation menu, at least one predetermined operation item corresponding to the traveling state of the vehicle detected by the detecting device, wherein said operation menu is substantially uniformly displayed over said entire surface of said display portion, and said operation menu covers a substantial portion of an area of said entire surface of said display portion until an item on the operation menu is selected.

7. A vehicle-mounted display system according to claim 6, wherein characters expressing functions of the operation items are not displayed for operation items that do not correspond to the screen displayed on the display, and are not displayed for operation items that do not correspond to the traveling state of the vehicle.

8. A vehicle-mounted display system according to claim 6, wherein the detecting device detects, as the traveling state of the vehicle, a state where the vehicle is traveling and a state where the vehicle is stopped.

9. A vehicle-mounted display system according to claim 6, wherein the output device is at least one of a navigation device, a VICS (vehicle information and communication system) device and an audio device.

10. A vehicle-mounted display system according to claim 9, wherein the navigation device outputs a travel route from a position of the vehicle to a destination, and when the display control device means displays a map screen indicating the position of the vehicle and a map screen indicating the destination, an operation menu for the map screen indicating the position of the vehicle is different from an operation menu for the map screen indicating the destination.

11. A display method for a vehicle-mounted display system comprising the steps of:
(a) outputting data;
(b) displaying, on an entire surface of a display portion, a screen based on the data output in step (a), and dividing the display portion into plural regions displaying screens based on different data outputted in step (a) on the plural divisional regions;
(c) selecting any one of the plural screens displayed in step (b); and
(d) displaying the screen selected in step (c) on the entire surface of the display portion, and simultaneously displaying an operation menu corresponding to the selected screen on the display portion together with the selected screen at the time the selected screen is selected, wherein said operation menu is substantially uniformly displayed over said entire surface of said display portion, and said operation menu covers a substantial portion of an area of said entire surface of said display portion until an item on the operation menu is selected.

12. A display method for a vehicle-mounted display system according to claim 11, further comprising the step of:
(e) detecting a traveling state of a vehicle, wherein
when one of the plural screens is selected in step (c), an operation menu containing an operation item corresponding to the traveling state of the vehicle is displayed in step (d) on the display portion together with the selected screen.

13. A display method for a vehicle-mounted display system according to claim 12, wherein in step (e), a state where the vehicle is traveling and a state where the vehicle is stopped are detected as the traveling state of the vehicle.

14. A display method for a vehicle-mounted display system according to claim 11, wherein the data outputted in step (a) is outputted from at least one of a navigation device, a VICS (vehicle information and communication system) device and an audio device.

15. A display method for a vehicle-mounted display system according to claim 11, wherein in step (e), one of the plural screens is selected by using a remote controller having a touch pad with a protuberance forming boundaries of division, the touch pad being divided in accordance with division of the screen and enabling the boundaries of division to be perceived upon touching by hand.

16. A display method for a vehicle-mounted display system comprising the steps of:
(a) outputting data;
(b) displaying, on a display portion, plural screens based on the data output in step (a);
(c) detecting a traveling state of a vehicle;
(d) selecting one of said plural screens;
(e) selecting a suitable operation menu such that an operation menu containing at least one operation item corresponding to the screen displayed in step (d) is displayed; and
(f) displaying over said entire display portion said selected screen and simultaneously displaying over said selected screen at least one predetermined operation item corresponding to the traveling state of the vehicle detected at the step (c) as the item of the operation menu, wherein said operation menu is substantially uniformly displayed over said entire surface of said display portion, and said operation menu covers a substantial portion of an area of said entire surface of said display portion until an item on the operation menu is selected.

17. A display method for a vehicle-mounted display system according to claim 16, wherein the characters expressing functions of the operation items are not displayed for operation items that do not correspond to the screen displayed in step (d), and are not displayed for operation items that do not correspond to the traveling state of the vehicle at the step (e).

18. A display method for a vehicle-mounted display system according to claim 16, wherein in step (c), a state where the vehicle is traveling and a state where the vehicle is stopped are detected as the traveling state of the vehicle.

19. A display method for a vehicle-mounted display system according to claim 16, wherein the data outputted in step (a) is outputted from at least one of a navigation device, a VICS (vehicle information and communication system) device and an audio device.

20. A display method for a vehicle-mounted display system according to claim 19, wherein the navigation device outputs a travel route from a position of the vehicle to a destination in step (a), and when a map screen indicating the position of the vehicle and a map screen indicating the destination are displayed in step (b), operation items of the operation menu selected in step (d) differ for an operation menu for the map screen indicating the position of the vehicle and an operation menu for the map screen indicating the destination.

* * * * *